June 2, 1959
F. R. KIMBROUGH
2,888,774
QUICK ATTACHING TYPE FISHING FLOAT
Filed Sept. 26, 1955
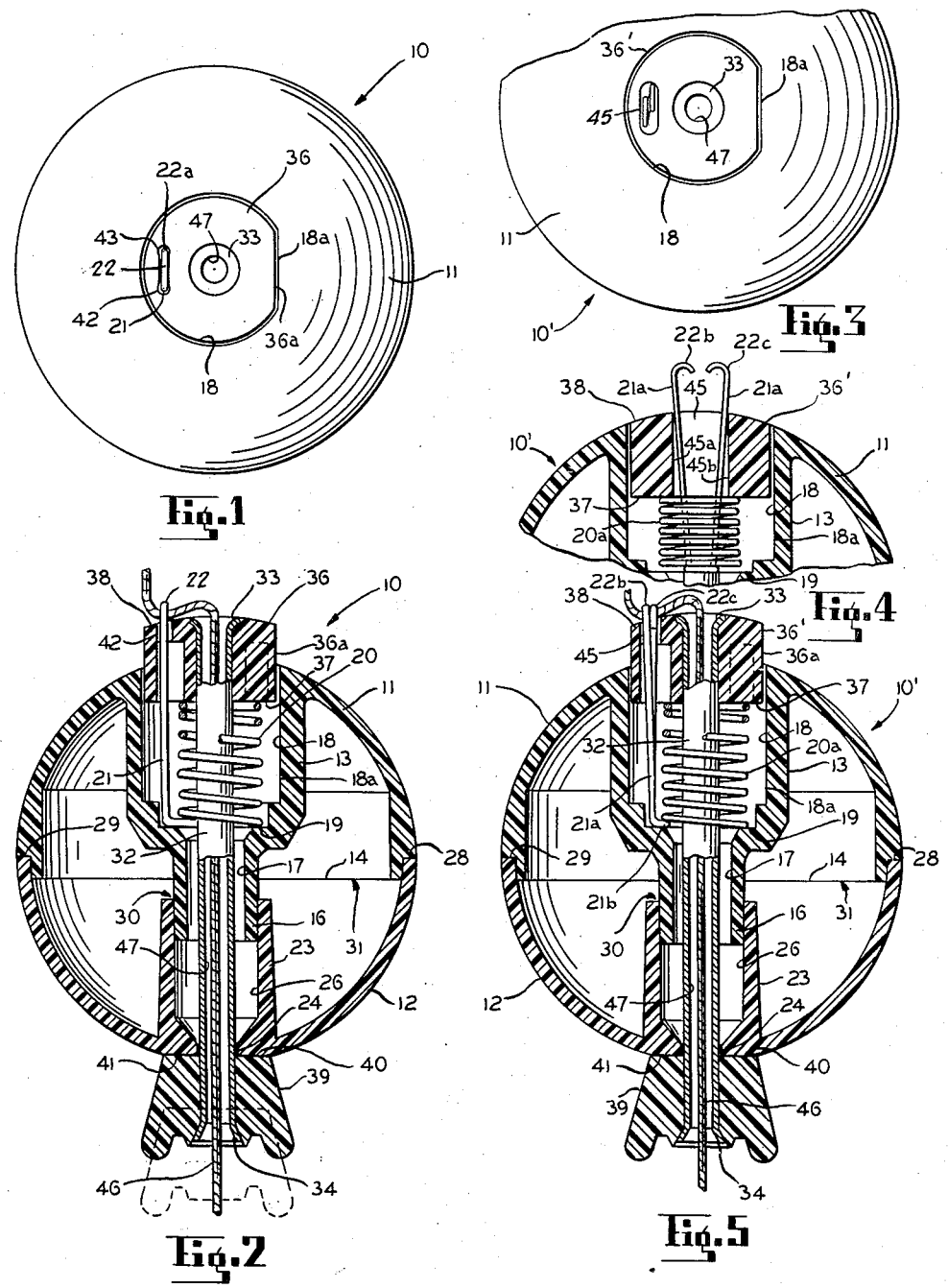
INVENTOR.
FRANK R. KIMBROUGH
BY
*Hill, Sherman, Meroni, Gross & Simpson*
ATTORNEYS

United States Patent Office 2,888,774
Patented June 2, 1959

2,888,774
QUICK ATTACHING TYPE FISHING FLOAT

Frank R. Kimbrough, Richmond, Va., assignor to Ideal Fishing Float Company, Inc., Richmond, Va., a corporation of Virginia Application September 26, 1955, Serial No. 536,709

2 Claims. (Cl. 43—44.91)

The disclosure of the present application constitutes a continuation-in-part of that disclosed in my copending application, Serial No. 471,985, filed November 30, 1954, now Patent No. 2,803,917, issued August 27, 1957.

This invention relates generally to a fishing float which combines in one float the features of a center threaded float that can be made stationary on the line at any point along the line, which is also usuable as slip or casting float, together with a means for quick attaching, these features being workable regardless of which end of the float is used as the top.

According to the principles of the present invention, a hollow buoyant body having a bore extending therethrough has one end of the bore counterbored with a recess generally circular in configuration but having a wall on one side which extends in a generally chordal relation to the axis of the recess. Received within the recess is a coiled compression spring. The spring is used to exert a continuous biasing force against a button or plunger which is slidably carried in the recess. The plunger is shaped to have a complemental configuration relative to the recess. Thus, a flat wall on one side of the plunger slidably confronts the corresponding flat wall on one side of the recess and insures that the plunger, although reciprocable in the hollow buoyant body, will not have relative rotation with respect thereto. Furthermore, it is not necessary to turn a line engaging plunger in order for the wire hook to recede in a hole in the plunger cap provided therefor since the plunger itself will not turn in the float body, although it will work slidably in the recess.

It is an object of the present invention, therefore, to provide a quick attaching type fishing float which may be conveniently adjusted along the length of a fishing line or which may be selectively used as a slip-type float.

Another object of the present invention is to provide an improved button and through plunger construction for a finger-manipulable float whereby mishandling of the movable parts of the float structure is minimized since the plunger is slidable but non-rotatable thereby keeping the wire hook in proper relation, once established, to the apertured head button for locking purposes.

Yet another object of the present invention is to provide an improved hook structure for a combination line-type float, slip-type float.

Many other features, advantages and additional objects of the present invention will become manifest to those versed in the art upon making reference to the detailed description which follows and the accompanying sheet of drawings in which a preferred structural embodiment incorporating the principles of the present invention is shown by way of illustrative example only.

On the drawings:

Figure 1 is a top plan view of a float embodying the principles of the present invention;

Figure 2 is a central cross-sectional view of the float shown in Figure 1 with parts shown in elevation and with parts broken away for the sake of clarity;

Figure 3 is a fragmentary plan view generally similar to Figure 1 and showing an alternative embodiment of the present invention;

Figure 4 is a fragmentary cross-sectional view showing the float of Fig. 3 with the button positioned to expose the claw-like hooks whereby a fishing line may be inserted; and Figure 5 is a central cross-sectional view similar to Fig. 2 but showing the structural details of the float illustrated in Figures 3 and 4.

As shown on the drawings:

The float of the present invention is indicated generally by the reference numeral 10 in Figures 1 and 2 and by the reference numeral 10' in Figs. 3, 4 and 5. Except for the hook structures, the two embodiments are otherwise similar and, accordingly, like reference numerals will be applied wherever possible for the sake of convenience and clarity.

The float 10 comprises a pair of generally semi-spherical members 11 and 12, respectively, fitted together to form a float body. The float 10 is conveniently made by molding a lightweight material such as a plastic or the like, and if desired, the float body may comprise two separate colors in accordance with conventional fishing float practice.

A boss 13 on the inside of the member 11 extends beyond the peripheral edge 14 of the semispherical member 11 and terminates in a reduced diameter neck 16 having a recess extending therethrough indicated generally at 17 and comprising an axial bore.

The enlarged portion of the boss 13 nearest the outermost portions of the semispherical member 11 has an enlarged counter-bore recess formed therein as at 18.

One wall of the recess 18 bears a chordal relation to the axis thereof and forms a flat wall indicated at 18a. Between the bore 17 and the recess 18, there is provided a shoulder 19 bottoming one end of a coil spring 20.

In the form of the invention shown in Figures 1 and 2, the coil spring 20 has a vertically bent wire 21 formed at one end thereof and extending generally parallel with respect to the longitudinal axis of the spring 20 outwardly of the recess 18 and outwardly of the semispherical member 11. At the outer extremity of the wire 21, there is formed a reversely turned hook portion indicated at 22. The hook portion 22 includes a downwardly extending leg 22a which lies in spaced relation to the main wire portion 21.

In the embodiment of Figures 3, 4 and 5, the coil spring constitutes a separate continuous biasing member 20a. Additionally, there is provided a separate wire spring member 21a having a lug portion 21b underlying the coil spring 20a at the shoulder 19 and including spaced leg portions extending generally parallel with respect to the longitudinal axis of the spring 20a outwardly of the recess 18 and outwardly of the semispherical member 11. At the outer extremity of each leg portion of the wire member 21a, there is formed oppositely turned hook portions indicated at 22b and 22c, respectively.

In both forms of the invention, the projecting boss 23 has a bore 24 counterbored at 26 inwardly thereof.

The boss 23 terminates inside of the peripheral edge 28 of the semispherical member 12 and the counterbore 26 is sized to be complementary to the outside diameter of the reduced neck 16 formed on the boss 13, thereby to facilitate a telescoping assembly of the bosses 13 and 23 when the semispherical members 12 and 11 are fitted together.

The peripheral edge portions 14 of the semispherical member 11 are also provided with an annular recess 29 which seats the adjoining peripheral edge 28 of the semispherical member 12 and when fitted together, the mated semispherical members 11 and 12 form a spherical float body which is essentially watertight. To insure sealing against leakage of fluid into the interior of the float body, a plastic solvent may be placed in the interior of the float body prior to fitting the semispherical members 11 and 12 together to insure cohesion of joining and abutting surfaces at the joints indicated at 30 and 31, respectively.

Slidably and reciprocably supported in the bore 24 of the semispherical member 12 is a tubular member 32. In this particular embodiment, the tubular member 32 takes the form of a seamless tube made of a non-corrosive metal and having its opposite end portions flared as at 33 and 34, respectively.

The flared portion 33 facilitates assembly onto one end of the tubular member 32 of a first button or plunger indicated at 36. The button 36 is generally cylindrical in configuration and is sized to be complementary to the shape of the recess 18. One side of the button 36 is flattened as at 36a thereby to provide a flat wall confronting the flat wall 18a in the recess 18. Accordingly, since the plunger is slidably received within the recess 18 in the manner of a piston or a plunger slidable on a cylinder or sleeve, there is full opportunity for reciprocation without any relative rotatability between the button 36 and the buoyant body of the float 10.

The flat side 36a of the button 36, together with the flat wall 18a in the recess 18, forms an alignment means which keeps the hook 22a in the recess 43.

The button 36 is provided with an end wall 37 disposed in a flat plane and abutting against one end of the spring 20. The opposite end wall of the button 36 is indicated at 38 and it will be noted that this wall is contoured complementary to the spherical contour of the semispherical member 11.

At the other end of the tubular member 32, there is attached a second button or finger-manipulable handle indicated at 39. The button 39 is rotatably carried on the end of the tube 32 since the flare portion 34 is not pressed outwardly sufficient to interfere with relative rotation between the handle 39 and the tube 32. Thus, the button 39 is loosely connected to the tube 32 with the flared portion 34 and is located outside of the float body with an end wall 40 abutting against an adjoining flattened wall portion 41 formed on the semispherical member 12.

The length of the tubular member 32 and the axial spacing dimension between the first and second buttons 36 and 39 is such that the coil spring 20 is preloaded. This is also true of the coil spring 20a. Moreover, the length of the wire 21 or the wire member 21a is selected so that the hook 22 on the extremity of the wire 21 and the hook portions 22b and 22c on the end of the wire member 21a will be retracted inwardly of the curved wall 38 on the button 36 when the button 36 is in outermost position.

The button 36, shown in the embodiment of the invention of Figures 1 and 2, has a recess opening 42 formed therein through which the main portion of the wire 21 passes. A recess 43 spaced from the recess 42 is also formed in the curved wall 38 in alignment with the curved-over, reversely bent portion 22a of the hook 22. Thus, the leg 22a of the hook 22 is received and seated in the recess 43 when the button 36 is spring-biased outwardly. Moreover, because of the relative rotatability between the handle 39 and the tube 32 and because of the non-rotatability between the button 36 and the body of the float 10, exact alignment of the hook 22 with the recess 43 is maintained, once established. Mishandling of the movable parts of the float structure is precluded and a fishing line slipped under the hook 22 will always be firmly engaged against the end wall 38 of the button 36 when the handle 39 is released and the spring 20 biases the button outwardly.

In the other form of the invention shown in Figures 3, 4 and 5, a single slotted opening is indicated at 45. The width of the slotted aperture or opening 45 is related to the width of the respective eyes provided by the hook portions 22b and 22c so that as the legs of the wire member 21a are retracted within the slotted aperture 45 of the button 36, the claw-like hook portions 22b and 22c are moved towards one another and finally overlapped to provide a single eye for engaging and clamping a fishing line.

In the position shown in Figure 3, the button 36' is depressed and the hook portions 22b and 22c extend outwardly of the slotted aperture 45. The wire member 21a preferably constitutes a spring wire or other metal having sufficient resilience to provide a natural tendency to be biased outwardly. Thus, the claw-like hook portions 22b and 22c are separated, as shown in Figure 3, to permit the ready insertion of a fishing line into the space between the hook portions 22b and 22c. Thereupon, release of the handle 39 affords a relative axial movement between the wire member 21a and the button 36 so that the hook portions 22b and 22c will overlap and form a single eye as shown in Figure 4. In Figure 3, the opposite walls of the slotted aperture 45 which bear upwardly against the legs of the wire member 21a are indicated at 45a and 45b, respectively. In operation, the assembled position of the float locates the button 36 in partially received position within the recess 18 and a portion thereof projects outwardly of the float body. By grasping the second button or handle 39 with the fingers, however, the entire plunger assembly including the button 39, the tubular member 32 and the button 36 may be moved axially against the spring bias of the coil spring 20 or 20a so that the plunger or button 36 will be wholly received within the recess 18 of the boss 13. Such movement will result in a relative axial movement between the wire 21 or the wire member 21a and the button 36 and the hook 22 or the claw-like hook portions 22b and 22c will be completely exposed, thereby facilitating clamping of a fishing line indicated at 46 under the hook 22 or between the opposed confronting claw-like hook portions 22b and 22c.

If it is desired to use the float 10 as a slip float, the fishing line 46 is merely extended through the bore 47 provided by the tubular member 32.

Although various minor modifications might be suggested by those versed in the art, it should be understood that I wish to embody within the scope of the patent warranted hereon all such modifications as reasonably and properly come within the scope of my contribution to the art.

I claim as my invention:

1. In a fishing float, a spherical hollow buoyant body having a center bore extending therethrough, one end of said bore having a counterbore formed therein, a tube in said center bore providing a through hole for freely passing a fishing line when the float is used as a slip float, a first button in said counterbore slidably engaging said body to radially position said tube and being partially recessed in said counterbore, a coil spring in said counterbore between said first button and said body having one end thereof forming a wire projecting through said first button and having a hook received and seated in a recess formed in an adjoining surface of said first button, and a pull button outside of said body at the other end of said tube and connected to said tube to pull said first button wholly into said counterbore, thereby moving said hook out of its recess for instantly converting said float into a stationary float by clamping the fishing line under the said hook, and alignment means between the hook and the button comprising a flat wall in said counterbore and an abutting flat side on said button preventing rotation of said button relative to said body and keeping said hook lined up with said recess.

2. In a fishing float, a hollow buoyant body having a bore extending therethrough, one end of said bore having a counterbore formed therein, a tubular member including a shank portion in said bore, a first button attached to said tubular member and located at one end thereof, said first button being partially received in said counterbore to slidably support and radially position said tubular member, a coil spring in said counterbore around said tubular member and bottomed at opposite ends against said first button and against said body, respectively, to resiliently load said tubular member, said coiled spring having one end thereof forming a wire hook projecting out of said float through said first button, said first button having a recess formed therein receiving and seating said wire hook, and a second button outside of said float body and connected to said tubular member at the other end thereof forming a finger manipulable handle by means of which said first button may be pulled wholly into said counterbore, against the bias of said spring for selectively exposing said hook, thereby to instantly convert the float from a slip float to a stationary float by clamping a fishing line between said hook and said first button, and alignment means between the hook and the button comprising a flat wall in said counterbore and a flat side on said button to prevent relative rotation therebetween and to keep said hook lined up with said recess.

References Cited in the file of this patent

UNITED STATES PATENTS

| | | |
|---|---|---|
| 862,853 | Simmons | Aug. 6, 1907 |
| 2,501,471 | Larson | Mar. 21, 1950 |
| 2,504,241 | Wulff | Apr. 18, 1950 |
| 2,560,129 | Rhotehamel | July 10, 1951 |
| 2,569,822 | Miller | Oct. 2, 1951 |
| 2,627,693 | Wanner | Feb. 10, 1953 |
| 2,670,560 | Matras | Mar. 2, 1954 |
| 2,680,322 | Schuermann | June 8, 1954 |
| 2,758,410 | Cowsert | Aug. 14, 1956 |